(12) United States Patent
Meyer-Rössler et al.

(10) Patent No.: US 12,255,957 B2
(45) Date of Patent: Mar. 18, 2025

(54) METHOD FOR SETTING UP A DATA CONNECTION, AND DATA TRANSFER SYSTEM

(71) Applicant: ZF CV Systems Global GmbH, Bern (CH)

(72) Inventors: Philip Meyer-Rössler, Giesen (DE); Janik Ricke, Uetze (DE)

(73) Assignee: ZF CV Systems Global GmbH, Bern (CH)

( * ) Notice: Subject to any disclaimer, the term of this patent is extended or adjusted under 35 U.S.C. 154(b) by 0 days.

(21) Appl. No.: 17/875,097

(22) Filed: Jul. 27, 2022

(65) Prior Publication Data

US 2022/0360631 A1    Nov. 10, 2022

Related U.S. Application Data

(63) Continuation of application No. PCT/EP2020/052224, filed on Jan. 30, 2020.

(51) Int. Cl.
*H04L 67/12* (2022.01)
*H04W 12/08* (2021.01)
*H04W 84/12* (2009.01)

(52) U.S. Cl.
CPC .............. *H04L 67/12* (2013.01); *H04W 12/08* (2013.01); *H04W 84/12* (2013.01)

(58) Field of Classification Search
CPC ..................... H04L 47/70; H04L 63/08; H04L 63/083–0846; H04L 63/0876;
(Continued)

(56) References Cited

U.S. PATENT DOCUMENTS 10,846,960 B1 * 11/2020 Lemberger ............. H04N 7/183
2006/0143097 A1    6/2006 Mitterreiter et al.
(Continued)

FOREIGN PATENT DOCUMENTS

DE    101 42 193 A1    4/2003
DE    101 44 002 A1    4/2003
(Continued)

OTHER PUBLICATIONS

Merriam-Webster definition of depot (Year: 2016).*
(Continued)

*Primary Examiner* — Boris D Grijalva Lobos
(74) *Attorney, Agent, or Firm* — Walter Ottesen, P.A.

(57) ABSTRACT

A method is for setting up a data connection between a terminal device of a telematics system in a vehicle and a central module of a stationary local area network (SLAN). The SLAN covers a depot. The method includes: providing access data for identifying and authenticating the terminal device in the SLAN, the access data being provided via an access network differing from the SLAN; transferring the provided access data to the terminal device in an automated manner using the access network; setting up a connection between the terminal device and the central module of the SLAN in an automated manner when the vehicle having the terminal device is located in range; authenticating the terminal device in an automated manner on the basis of the access data to check authenticity of the terminal device; and, authorizing the terminal device and/or the vehicle automatically if the terminal device is authentic.

14 Claims, 2 Drawing Sheets

(58) Field of Classification Search
CPC ..... H04L 63/0884; H04L 63/10; H04L 63/12; H04L 63/107; H04L 67/12; H04W 12/08
See application file for complete search history.

(56) References Cited

U.S. PATENT DOCUMENTS

| | | | |
|---|---|---|---|
| 2008/0059476 A1* | 3/2008 | Alrabady | H04W 4/40 |
| 2011/0081890 A1 | 4/2011 | Ahmadvand et al. | |
| 2013/0304879 A1 | 11/2013 | Schmidt | |
| 2013/0337801 A1* | 12/2013 | Yi | H04W 80/10 |
| | | | 455/426.1 |
| 2014/0263629 A1* | 9/2014 | McQuade | B67D 7/0401 |
| | | | 235/381 |
| 2014/0359724 A1* | 12/2014 | Kubisch | H04L 67/12 |
| | | | 726/5 |
| 2016/0014820 A1 | 1/2016 | Dhanabalan et al. | |
| 2017/0124784 A1* | 5/2017 | Wittmann | G06V 30/224 |
| 2018/0232976 A1* | 8/2018 | Schoenfelder | H04L 63/08 |
| 2019/0100231 A1* | 4/2019 | Stanek | G05D 1/0088 |
| 2019/0104119 A1* | 4/2019 | Giorgi | H04L 63/102 |
| 2019/0265064 A1* | 8/2019 | Koenig | G01C 21/00 |
| 2020/0242858 A1* | 7/2020 | Meroux | G07C 5/085 |
| 2020/0294401 A1* | 9/2020 | Kerecsen | G05D 1/0287 |
| 2021/0034060 A1* | 2/2021 | Patnaik | H04W 4/46 |
| 2021/0347568 A1* | 11/2021 | Chen | G07F 11/004 |

FOREIGN PATENT DOCUMENTS

| | | | | |
|---|---|---|---|---|
| DE | 103 59 836 A1 | 7/2005 | | |
| DE | 10 2014 201 468 B3 | 2/2015 | | |
| DE | 10 2017 009 015 A1 | 3/2019 | | |
| JP | 3115125 U | * 7/2005 | ............ | G08G 1/017 |
| WO | 00/70530 A1 | 11/2000 | | |
| WO | 2016/106774 A1 | 7/2016 | | |

OTHER PUBLICATIONS

Navigate Definition & Meaning—Merriam-Webster (Year: 2022).*
Translation of Written Opinion of the International Searching Authority dated Oct. 5, 2020 for international application PCT/EP2020/052224 on which this application is based.
International Search Report of the European Patent Office dated Oct. 5, 2020 for international application PCT/EP2020/052224 on which this application is based.

* cited by examiner

METHOD FOR SETTING UP A DATA CONNECTION, AND DATA TRANSFER SYSTEM

CROSS REFERENCE TO RELATED APPLICATION

This application is a continuation application of international patent application PCT/EP2020/052224, filed Jan. 30, 2020 designating the United States, and the entire content of the above application is incorporated herein by reference.

TECHNICAL FIELD

The disclosure relates to a method for setting up a data connection between a terminal device in a vehicle and a central module of a stationary local area network, and to a data transfer system for implementing the method.

BACKGROUND

At automated or semi-automated depots or freight yards, there may be a stationary local area network, which covers a spatially delimited environment of the depot, and via which a data exchange can take place between a terminal device in an incoming vehicle and the depot. Current automated or semi-automated depots, however, do not use the data connection between the terminal device and a central module of the stationary local area network to increase the level of automation.

Instead, the driver of the incoming vehicle must get out of the vehicle on arrival at the depot in order to be identified and authenticated, and to find out the loading and unloading station, for instance a ramp, at which loaded freight is meant to be unloaded, or the loading and unloading station from which freight to be transported is meant to be retrieved. This is not only time consuming, but in the international driver environment repeatedly results in comprehension problems between the driver and the staff at the depot. This means, however, that loading and unloading operations as well as other operational processes at the depot may not be performed smoothly and quickly.

Thus until now, there has been no provision for automated coordination and communication via the pre-existing stationary local area network.

DE 101 42 193 A1, for example, describes setting up a data connection in an automated manner, with a data connection being established between a terminal device in a vehicle and a WAP gateway. In order to establish the data connection, access data is used that either is stored on the vehicle itself or can be requested additionally depending on the type of access.

DE 103 598 36 A1 describes automatically setting up a data connection between terminal devices in a vehicle and a central unit outside the vehicle, with a login procedure carried out before the exchange of data. This is done by the central unit delivering an SMS via the mobile network to a mobile phone in the vehicle. The terminal devices in the vehicle have access to the mobile phone and can evaluate the delivered SMS or the message to establish whether they are being prompted to carry out the login procedure. Any automated connection and authentication of a terminal device in a local area network does not take place subsequently.

In addition, WO 00/70530 describes reading out data automatically from a vehicle when the vehicle arrives at a depot. This is done by using preprogrammed transmitters and receivers, which continuously transmit and receive without connecting into a stationary local area network for the purpose.

DE 10 2014 201 468 B3 proposes making access data available only locally to ensure that only a user located on the spot can use the access data for a mobile device (for example, smartphone, tablet computer). DE 10 2017 009 015 A1 provides that for the purpose of authorization, the user of the terminal device receives a task from the central module of the network and must complete this task on the terminal device.

In addition, camera systems are also known that can recognize and identify vehicles from a camera image.

Furthermore, DE 101 44 002 A1 discloses implementing vehicle functions of a vehicle via an organizer. For this purpose, selectable interaction codes are stored on the organizer, which can be enabled via an authentication code and subsequently activated in order to perform a vehicle function corresponding to the interaction code, for instance opening the vehicle.

In addition, WO 2016/106774 A1 describes unlocking a terminal via two patterns drawn by a user on a touchscreen.

SUMMARY

It is an object of the disclosure to provide a method for setting up a data connection between a terminal device in a vehicle and a central module of a stationary local area network of a depot, which method can be used to simplify access by a vehicle and communication with a vehicle and/or coordination of a vehicle at the depot.

This object can be achieved, for example, by methods of the disclosure as described herein.

It is a further object of the disclosure to provide a data transfer system. This object can be achieved, for example, by data transfer systems as described herein.

Hence according to the disclosure, in order to set up a data connection between a terminal device of a telematics system, in particular a fleet management system, in a vehicle, in particular in a commercial vehicle and/or a trailer, and a central module (access point) of a stationary local area network (for example, WLAN), wherein the stationary local area network covers a delimited spatial environment of a depot, at least the following steps are provided:

providing access data for identifying and authenticating the terminal device or the vehicle in the stationary local area network, wherein the access data is provided via a preferably global access network, wherein the access network differs from the stationary local area network;

transferring the provided access data to the terminal device in an automated manner using the access network exclusively or indirectly;

setting up a data connection between the terminal device and the central module of the stationary local area network in an automated manner when the vehicle having the terminal device is located in a transmit and receive range of the central module, preferably in an entrance area of the depot, wherein, for this purpose, the terminal device identifies and authenticates itself automatically with the stationary local area network in a login procedure on the basis of the transferred access data;

authenticating the terminal device or the vehicle in an automated manner on the basis of the access data in order to check authenticity of the terminal device or of the vehicle: and authorizing the terminal device and/or the vehicle in an automated manner if the terminal device or the vehicle is classified as authentic or the authentication is successful. Preferably, the vehicle is thereby automatically allowed access to the depot and/or the terminal device is automatically allowed to exchange data via the formed data connection.

It can thereby advantageously be possible in a fully automated method to establish a secure and verified data connection between the terminal device and the stationary local area network, and also to grant authorization or access permission without the driver needing to intervene or the need for any other manual intervention. Hence the connection can be set up in a manner that is fully independent of language and without further manual intermediate steps, thereby increasing the degree of automation and simplifying and speeding up the general process at the depot. Furthermore, there is no need for any further active inquiry or active request because the individual operations are performed in an automated manner at the given times. This greatly simplifies overall the coordination and communication at the depot.

The term "authenticate" is understood to mean here that a station, in this case the vehicle or the terminal device, proves its own identity, for instance claimed via a user name, for example via an authentication code or a password. On the basis of this access data, that is, the user name and/or the authentication code, the station can then first be identified, and, in a subsequent authentication procedure, also "authenticated" in order to ascertain the authenticity of the station or verify whether the station is "authentic". Afterwards, in an authorization procedure, the station can then be given permission or "authorized" for certain accesses or actions.

In addition, a delimited local environment of the stationary local area network, in contrast to a global area network, for example, the Internet or a mobile communications network, shall be understood to mean that access to the stationary local area network, for example, WLAN, is possible only from a limited number of positions, namely in the area or environment of the depot.

It can preferably also be provided that the access data contains a station identifier (cf. user name) for identifying the terminal device or the vehicle, and/or a network identifier (cf. SSID, service set identifier) for identifying the stationary local area network and/or an authentication code for authenticating the terminal device or the vehicle with the stationary local area network. The station can identify and authenticate itself easily in the correct network using this access data, making the connection setup simple overall.

It can also preferably be provided that extended authentication data additional to the access data is provided via the access network, wherein the extended authentication data includes an authentication token for authenticating the terminal device or the vehicle with the stationary local area network depending on authentication conditions. It is thereby possible to define additional conditions that are taken into account in the automated authentication. For example, it can be provided that an authentication validity and/or authentication frequency is specified via the authentication conditions. It can hence be specified, for example by the service-provider backend, how long the terminal device can be authenticated in the stationary local area network via the authentication code, and how often authentication is possible. This is then taken into account automatically in the subsequent authentication.

It can also preferably be provided that the access data is provided in a wireless and/or wired manner via the access network in order to allow a flexible facility for transferring this data to the terminal device. For example, the access data can be provided wirelessly via the Internet and/or via a mobile communications network as the access network. This results in the facility to transfer the access data at almost any position onto the terminal device before the vehicle having the terminal device arrives at the depot.

It can preferably also be provided that as a result of the authorization given the authenticity of the vehicle, an entrance to the depot, for instance a gate or a barrier, is opened automatically, and/or permission is given for manual or automatic opening of a loading-and-unloading bay gate of a loading-and-unloading bay assigned to the vehicle and on a site of the depot, for the purpose of loading or unloading freight. Hence accesses can also be enabled or opened in an automated manner at the same time as the authorization as part of the verification of the data connection, advantageously allowing a further increase in the degree of automation at the depot.

It can preferably also be provided that the loading-and-unloading bay is assigned according to data transferred via the data connection, for which purpose loading information and/or unloading information is transferred via the data connection. It is hence advantageously possible to take into account also additional transferable data relevant to the authorization, in particular relevant to access to areas of the depot. The type of freight to be loaded or unloaded, which is indicated in the waybills and contained in the loading information or unloading information, can hence be consulted in order to allow or prohibit an action at the depot by the vehicle. In addition, for instance in the case of an incorrect load or theft, the yard or yard gate can also remain closed.

It can also preferably be provided that as a result of the authorization given the authenticity of the vehicle, driving information and/or bay information and/or vehicle control data is transferred to the terminal device in order to coordinate the vehicle at the depot, for instance also according to the loading information and unloading information. Hence it is also advantageously possible to stipulate to the vehicle at the depot, how the vehicle must move at the depot, that is, for instance along a certain trajectory and/or at a defined maximum speed, preferably coupled to the permissions, for instance the assigned loading-and-unloading bay, or to which loading-and-unloading bay or to which bay location the vehicle is meant to move. The process and the coordination at the depot can thereby be simplified overall, where this can again take place in a fully automated manner because data that can be transferred in an automated manner can be used by the system to perform the authorization procedure in an automated manner. This information can preferably be reproduced via the terminal device in the language of the driver in order to overcome the mentioned communication problems and hence contribute to a faster process.

It can also preferably be provided that setting up a data connection between the terminal device and the central module of the stationary local area network in an automated manner is performed when the vehicle having the terminal device is in an entrance area of the depot, wherein the transmit and receive range also covers the entrance area. Since the access data has already been delivered in advance to the terminal device, the terminal device can thereby automatically perform an authentication on the basis of the access data, and if applicable the extended authentication data, at a position immediately in front of the entrance to the depot. In this process, a direct login to the network can advantageously take place, whereupon authentication and authorization can be performed immediately, By virtue of the direct connection to the stationary local area network, large data volumes can also be transferred quickly, which can then be used in particular for the authorization. The large data volumes relate to the information about the freight, for instance image recordings by the CargoCam (freight monitoring camera) in the trailer, and the further data for, or about, the vehicle. The authorization itself takes up a rather small portion of the data volume here.

It can also preferably be provided that transferring the provided access data to the terminal device in an automated manner using the access network is performed at a certain specified time and/or when the vehicle and/or the terminal device is in a certain specified position. The position can be specified and ascertained, for example, on the basis of position signals (global navigation satellite system (GNSS): for example, GPS, GLONAS, et cetera), for instance depending on a distance to the depot. In addition, the time can be specified according to an arrival of the vehicle at the depot. It can hence be specified in advance when it is reasonable for an automated transfer of the provided access data and/or of the extended authentication data to take place.

According to the disclosure, a data-transfer system is also provided for implementing the method according to the disclosure, having a terminal device of a telematics system, in particular a fleet management system, a service-provider backend which can be connected to the terminal device via an access network, and a central module of a stationary local area network. The terminal device may be a mobile terminal device, for instance a mobile phone, a tablet, a laptop, or the terminal device may be fixedly installed in the vehicle. Various embodiments are thereby possible, some of which can be upgraded or modified easily.

BRIEF DESCRIPTION OF THE DRAWINGS

The invention will now be described with reference to the drawings wherein.

DESCRIPTION OF THE PREFERRED EMBODIMENTS

Figure 1:
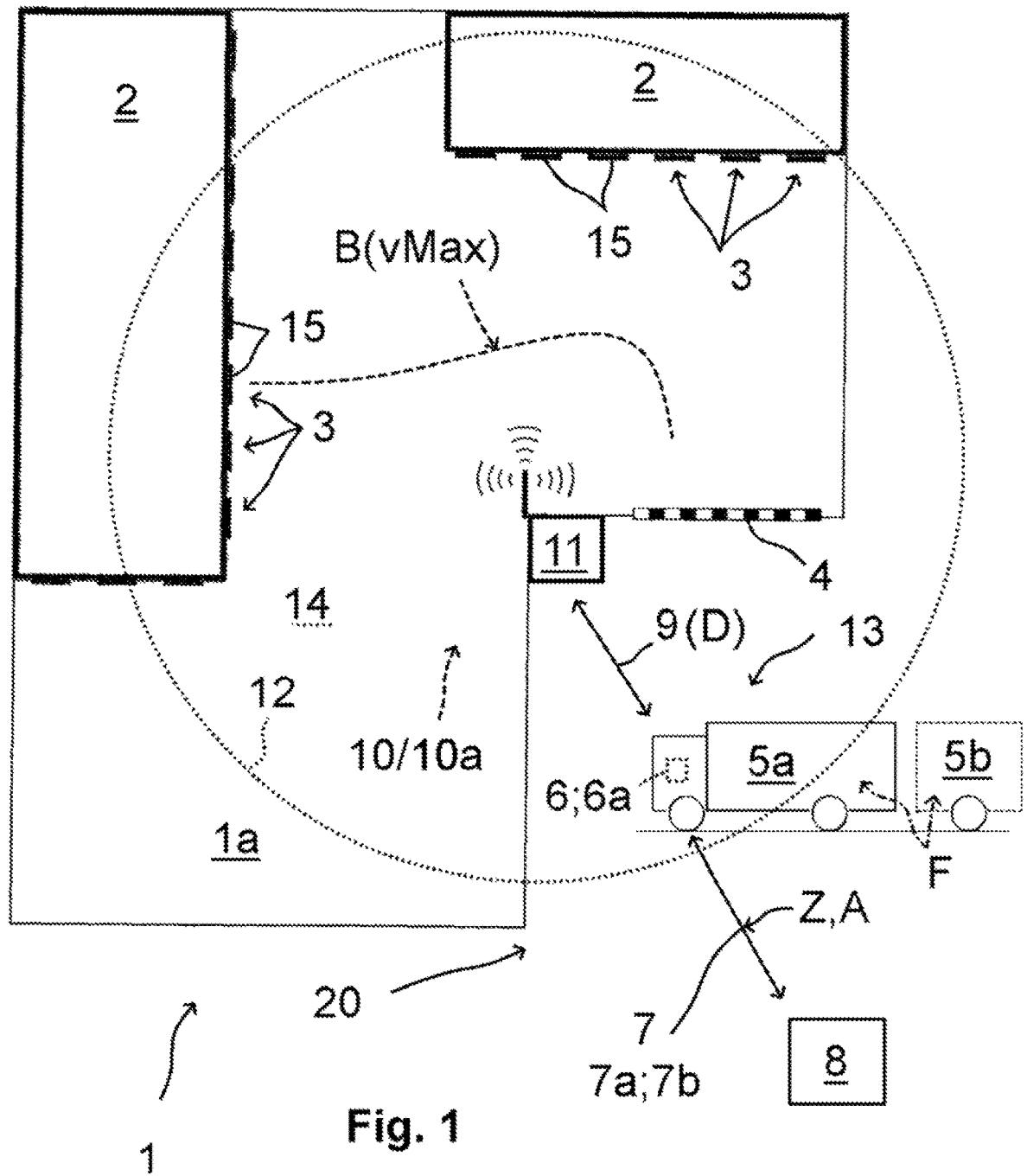
FIG. 1 is a schematic view of a depot having an incoming vehicle.

FIG. 1 shows a depot 1 which, at each of two buildings 2, has a plurality of loading-and-unloading bays 3, for instance ramps, skips, conveyor belts, gas pumps, silos, heaps, et cetera, for loading and unloading a vehicle 5, in particular a commercial vehicle, which may be in one or more parts (with trailers). The depot 1 is accessible via an entrance 4, for example a gate or a barrier. An incoming vehicle 5, for instance a commercial vehicle 5*a* having a trailer 5*b*, can drive onto the site 1*a* of the depot 1 when the entrance 4 is open, and move to one of the loading-and-unloading bays 3 in order to load on freight F to be transported and/or to offload transported freight F.

The depot 1 allows fully automated or semi-automated processing, relying on an automated exchange of data D with the vehicle 5, that is, with the commercial vehicle 5*a* and/or with the trailer 5*b*, for this purpose. The automated exchange of data D can ensure both automated access to the site 1*a* of the depot 1 and coordination of the vehicle 5 inside the depot 1.

Coordination shall be understood to mean here that the vehicle 5 can be conducted, for example, to the correct building 2 and also to the relevant loading-and-unloading bay 3. This can be done, for example, by defining a trajectory B for the vehicle 5. In conjunction with this, vehicle control data OF for the depot 1, for instance a maximum speed vMax, can also be defined. In addition, the driver can be notified of certain time schedules at the depot 1. Furthermore, important information about the freight F on board or to be loaded, can be exchanged. Communication is thereby greatly simplified, because the driver does not have to get out of the vehicle 5, and comprehension problems do not arise if, for instance, standardized data D is used.

To facilitate this, the vehicle 5 has a terminal device 6 assigned thereto, which is part of a telematics system TS, in particular a fleet management system (FMS). The terminal device 6 may be fixedly installed in the vehicle 5, that is, in the commercial vehicle 5*a* or the trailer 5*b*, or else be in the form of a mobile terminal device 6*a*. The mobile terminal device 6*a* may be a mobile phone, laptop, tablet, et cetera, on which is installed the software of the fleet management system FMS as an application or program.

The terminal device 6 is configured to obtain via an access network 7 access data Z and, if applicable, also extended authentication data A from a service-provider backend 8, for instance from a program or a server of a service provider. The data transfer via the access network 7 takes place preferably in encrypted form so that the access data Z and, if applicable, the extended authentication data A can be transferred securely.

The access network 7 can advantageously be wireless. The access network 7 may be, for example, the Internet 7*a* and/or a mobile communications network 7*b*. In principle, however, the access network 7 can also be wired at least in part. For example, the terminal device 6 can be connected, for instance in a workshop or at any depot, via a cable to a router, itself connected directly to the service-provider backend 8 or indirectly via the Internet to the service-provider backend 8. A wireless access network 7 can preferably be provided, however, via which the access data Z and, if applicable, the extended authentication data A can be received while the vehicle 5 is traveling.

The terminal device 6 in the incoming vehicle 6 is also configured to connect into a stationary and local area network 10, for example a WLAN network 10*a*, of the depot 1 in an automated manner. To do this, the terminal device 6 can set up a data connection 9 to a central module 11 of the stationary local area network 10. The central module 11 has a certain transmit and receive range 12, which preferably covers some of the site 1*a* of the depot 1 and also an entrance area 13 of the depot 1. The entrance area 13 is the area in front of the entrance 4 to the depot 1, which an incoming vehicle 5 enters before it can pass through the site Is of the depot 1 through the opened entrance 4.

The transmit and receive range 12 covers, in contrast to a global area network, only a local or delimited spatial environment 14, which here includes mainly the area around the depot 1. Consequently, access to the stationary local area network 10 is also possible only inside the transmit and receive range 12 of the central module 11 and hence from a very limited number of positions.

Figure 2:
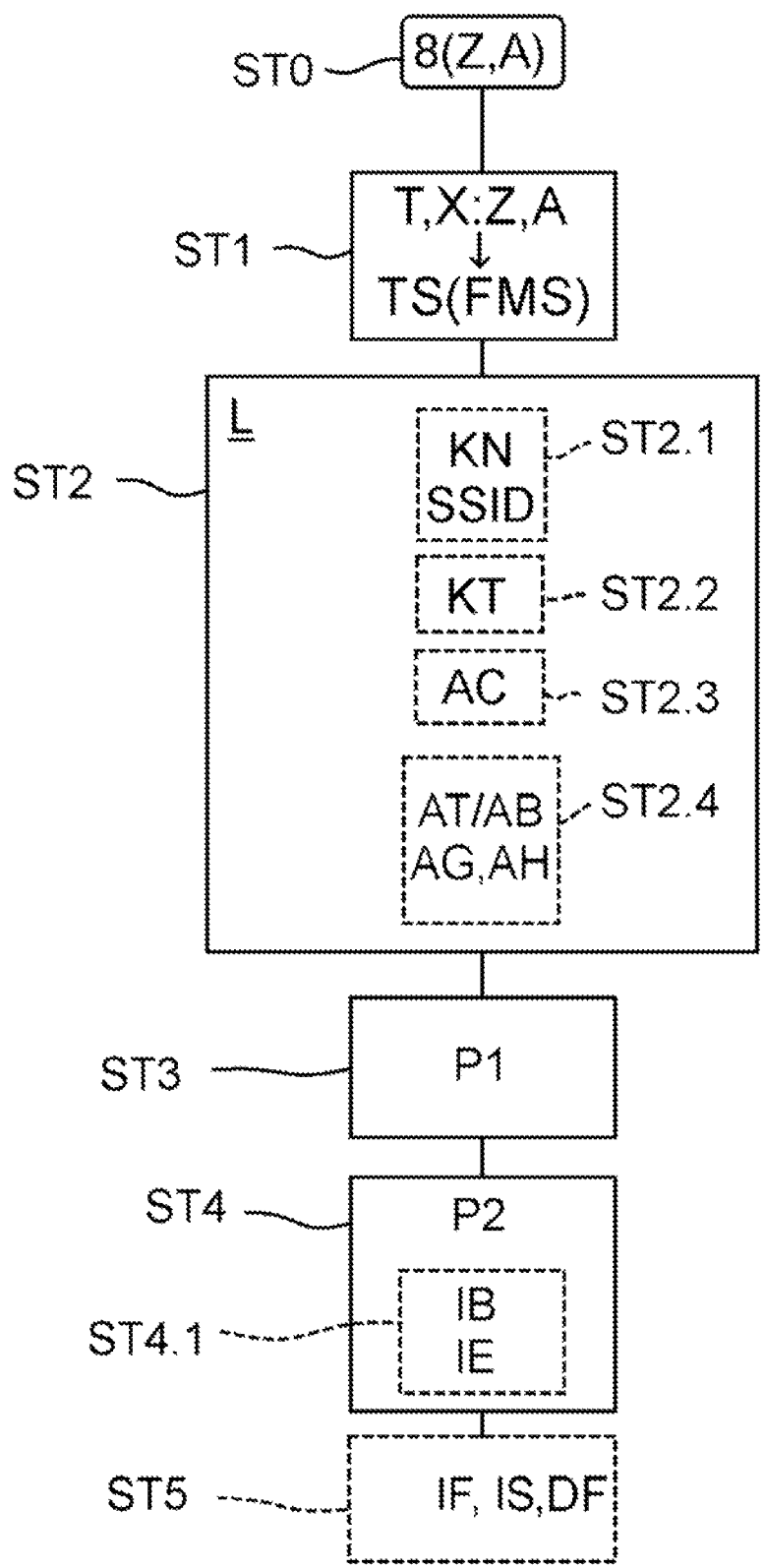
FIG. 2 is a flow diagram of the method according to the disclosure.

As soon as the terminal device 6 enters this transmit and receive range 12, the data connection 9 can be set up between the central module 11 and the terminal device 6. The data connection 9 for exchanging data D is set up, for example, in accordance with the flow diagram in FIG. 2:

In a first step ST1, which is performed in a specified situation, for example at a certain time T and/or at a certain position X of the vehicle 5, the access data Z and, if applicable, the extended authentication data A is transferred via the access network 7 to the terminal device 6 of the telematics system TS or fleet management system EMS. The driver in the vehicle 5 can preferably be unable to read or decrypt and hence modify this access data D, which is transferred in encrypted form and generated and provided by the service-provider backend 8 in a previous step ST0, nor, if applicable, the extended authentication data A.

The vehicle 5 subsequently arrives at the depot 1 and enters at some point in time the entrance area 13 and hence also the transmit and receive range 12 of the stationary local area network 10 or of the central module 11.

Thereupon, in a second step ST2 (authentication), the access data Z provided in advance is used in a login procedure L to establish a data connection 9 between the terminal device 6 and the central module 11.

In this process, in a first intermediate step ST2.1, it can first be ascertained from the access data Z whether a network identifier KN of the stationary local area network 10 is correct, where this can be done, for example, on the basis of a service set identifier SSID delivered with the access data Z.

In a second intermediate step ST2.2, a station identifier KT, which is delivered via the access data Z and can be used to identify the station or the relevant vehicle 5, is entered or delivered. This is comparable to entering a user name, which in this case is created and provided by the service-provider backend 8 and assigned to the corresponding vehicle 5.

Then, in a third intermediate step ST2.3, an authentication code AC (cf. password) delivered via the access data Z is entered or delivered. This is created and assigned to the station identifier KT in advance by the service-provider backend 8 on an individual basis. The terminal device 6 or the vehicle 5 authenticates itself with the stationary local area network 10 via the authentication code AC.

In a further, optional fourth intermediate step ST2.4, depending on the security requirement of the stationary local area network 10, the extended authentication data A delivered in advance can also be used. This may be, for example, an authentication token AT or an access profile containing additional authentication conditions AB. For example, an authentication validity AG can be specified thereby, that is, over what time period the vehicle 5 or the terminal device 6 can authenticate itself via the authentication token AT in the stationary local area network 10. If the authentication taken AT has expired, a subsequent authentication procedure P1 will fail or an existing data connection is suspended. In addition, an authentication frequency AH can also be specified, via which it can be specified that the authentication token AT can be used only for one login procedure L.

Via this access data Z and optionally the extended authentication data A, the stationary local area network 10 can identify and authenticate the vehicle 5 in an authentication procedure P1 in a subsequent third step ST3. Thus the access data Z created individually for the particular vehicle 5 is used to check the authenticity of the vehicle 5 or of the terminal device 6, and relating thereto, whether the vehicle 5 is entitled to drive around the depot 1.

In a fourth step ST4, after successful authentication of the vehicle 5 or of the terminal device 6, an authorization procedure P2 takes place. In this procedure, the vehicle 5 is allowed access both to the stationary local area network 10 and to the depot 1. This can preferably be manifested by the entrance 4 to the depot 1 being opened automatically. In addition, data D for coordination and communication can be exchanged via the then formed data connection 9.

In an optional intermediate step ST4.1, for example loading information IB and/or unloading information 1E can be exchanged via the data connection 9. This indicates what freight F the vehicle 5 has loaded and what freight F is meant to be loaded onto the vehicle 5 respectively.

This can be used as part of the authorization procedure P2 to allow access to individual loading-and-unloading bays 3 for loading or unloading. For example, loading-and-unloading bay gates 15 can be opened manually or in an automated manner on the relevant loading-and-unloading bays 3 for which permission has been granted on the basis of the information 1B, 1E. Hence the driver of the vehicle 5 is given access only to the loading-and-unloading bays 3 assigned to him on the basis of his order.

The particular vehicle 5 (station) can thus use the access data Z and, if applicable, the extended authentication data A to log into the stationary local area network 10 systematically and in a fully automated procedure by the relevant exchange of data, and after the identification, authentication and authorization in the stationary local area network 10 automatically gains access with the accordingly specified permissions.

With the successful conclusion of the authentication and authorization procedures P1, P2, optionally a series of further functions can be implemented simultaneously by an automated exchange of data D via the then verified data connection 9.

On the basis of the loading information and unloading information IB, IE, the central module 11 can transfer (ST5), for example, driving information IF and/or bay information IS and/or vehicle control data DF to the terminal device 6 via the data connection 9. The driving information IF indicates how the vehicle 5 has to move after driving onto the site 1a of the depot 1 in order to get to the correspondingly assigned loading-and-unloading bay 3. This can be notified to the driver via the terminal device 6, for instance in the form of navigation instructions and/or a trajectory B. In addition, via the bay information IS, instructions relating to the bay location, for instance a bay location number denoting the assigned loading-and-unloading bay 3, can be transferred, something that can also be visually displayed on the terminal device 6. The vehicle control data DF can additionally contain, for example, a maximum speed vMax to be observed at the depot 1.

As a result of the transfer of the various data D, that is, the access data Z, the extended authentication data A, the driving information IF, the bay information IS, the unloading information 1E, the loading information 1B, et cetera, via the data connection 9 made to the central module 11, communication and coordination can take place independently of language and above all in a fully automated manner. The driver can hence understand and receive via his terminal device 6 all the instructions that are provided in the stationary local area network 10 or via the central module 11. At the same time, the identification, authentication and authorization in the stationary local area network 10 can take place without the driver being involved, thereby significantly increasing the degree of automation. It is understood that the foregoing description is that of the preferred embodiments of the invention and that various changes and modifications may be made thereto without departing from the spirit and scope of the invention as defined in the appended claims.

LIST OF REFERENCES (PART OF THE DESCRIPTION)

1 depot
1a site
2 building
3 loading-and-unloading bay
4 entrance
5 vehicle
5a commercial vehicle
5b trailer
6 terminal device
6a mobile terminal device
7 access network
7a Internet
7b mobile communications connection
8 service-provider backend
9 data connection
10 stationary local area network
10a WLAN network
11 central module
12 transmit and receive range
13 entrance area
14 environment
15 loading-and-unloading bay gate
20 data transfer system
A extended authentication data
AB authentication conditions
AC authentication code
AG authentication validity
AH authentication frequency
AT authentication token
B trajectory
D data
DF vehicle control data
F freight
FMS fleet management system
IB loading information
IE unloading information
IF driving information
IS bay information.
KN network identifier
KT station identifier
L login procedure
P1 authentication procedure
P2 authorization procedure
SSID service set identifier
T time
TS telematics system
vMax maximum speed
X position
access data
ST0, ST1, ST2, ST2.1, ST2.2, ST2.3, ST2.4, ST3, ST4, ST4.1, ST5 steps of the method

What is claimed is:

1. A method for setting up a data connection between a terminal device of a telematics system inside a utility vehicle and a central module of a stationary local area network, wherein the stationary local area network covers a delimited spatial environment of a depot, the method comprising:
providing access data for identifying and authenticating the terminal device in the stationary local area network, wherein the access data is provided via an access network, wherein the access network differs from the stationary local area network;
transferring the provided access data to the terminal device in an automated manner using the access network;
setting up a data connection between the terminal device and the central module of the stationary local area network in an automated manner when the vehicle having the terminal device is located in a transmit and receive range of the central module, wherein, for this purpose, the terminal device identifies and authenticates itself automatically with the stationary local area network in a login procedure on a basis of the transferred access data;
authenticating the terminal device in an automated manner on the basis of the access data in order to check authenticity of the terminal device; and,
authorizing at least one of the terminal device and the vehicle in an automated manner if the terminal device is classified as authentic;
exchanging loading/unloading information between the terminal device and the central module of the depot;
wherein, as a result of the authorizing of the authenticity of the vehicle, at least one of driving information in the form of navigation information or trajectory information, and vehicle control data is transferred to the terminal device in order to coordinate the vehicle at the depot, wherein said vehicle control data comprise a speed limit to be respected when driving at the depot;
wherein, as a result of the authorizing of the authenticity of the vehicle, an entrance to the depot is opened automatically; and, as a result of the exchange of loading/unloading information, a permission is given for manual or automatic opening of a loading-and-unloading bay gate of a loading-and-unloading bay assigned to the vehicle, for the purpose of loading or unloading freight, wherein the loading-and-unloading bay is in an area of the depot; and,
wherein the loading-and-unloading bay is assigned according to data transferred via the data connection, wherein, for this purpose, at least one of loading information and unloading information is transferred via the data connection.

2. The method of claim 1, wherein, if the terminal device is classified as authentic, at least one of: i) the vehicle is automatically allowed access to the depot; and, ii) the terminal device is automatically allowed to exchange data via the data connection.

3. The method of claim 1, wherein the access data includes at least one of a station identifier for identifying the terminal device, a network identifier for identifying the stationary local area network, and an authentication code for authenticating the terminal device with the stationary local area network.

4. The method of claim 1, wherein said providing access data for identifying and authenticating the terminal device in the stationary local area network includes providing extended authentication data via the access network in addition to the access data; and, wherein the extended authentication data includes an authentication token for authenticating the terminal device with the stationary local area network in dependence upon authentication conditions.

5. The method of claim 4, wherein at least one of an authentication validity and an authentication frequency is specified via the authentication conditions.

6. The method of claim 1, wherein the access data is provided in at least one of a wireless and a wired manner via the access network.

7. The method of claim 6, wherein the access data is provided wirelessly via at least one of the internet and a mobile communications network as the access network.

8. The method of claim 1, wherein the stationary local area network having the delimited spatial environment is a WLAN network.

9. The method of claim 1, wherein said setting up the data connection between the terminal device and the central module of the stationary local area network in the automated manner is performed when the vehicle having the terminal device is in an entrance area of the depot; and, wherein the transmit and receive range of the central module also covers the entrance area.

10. The method of claim 1, wherein said transferring the provided access data to the terminal device in the automated manner using the access network is at least one of performed at a certain specified time, performed when the vehicle is in a specified location, and the terminal device is in a certain specified position.

11. The method of claim 1, wherein the telematics system is a fleet management system.

12. The method of claim 1, wherein the vehicle is at least one of a commercial vehicle and a trailer.

13. A data-transfer system comprising:
- a terminal device of a telematics system inside a utility vehicle;
- a service-provider backend connectable to said terminal device via an access network;
- a control module of a stationary local area network covering a delimited spatial environment of a depot; and,
- said data-transfer system being configured to implement a method for setting up a data connection between said terminal device of said telematics system and said control module, the method including:
  - providing access data for identifying and authenticating the terminal device in the stationary local area network, wherein the access data is provided via an access network, wherein the access network differs from the stationary local area network;
  - transferring the provided access data to the terminal device in an automated manner using the access network;
  - setting up a data connection between the terminal device and the central module of the stationary local area network in an automated manner when the vehicle having the terminal device is located in a transmit and receive range of the central module, wherein, for this purpose, the terminal device identifies and authenticates itself automatically with the stationary local area network in a login procedure on a basis of the transferred access data;
  - authenticating the terminal device in an automated manner on the basis of the access data in order to check authenticity of the terminal device; and,
  - authorizing at least one of the terminal device and the vehicle in an automated manner if the terminal device is classified as authentic;
  - exchanging loading/unloading information between the terminal device and the central module of the depot;
  - wherein, as a result of the authorizing of the authenticity of the vehicle, at least one of driving information in the form of navigation information or trajectory information, and vehicle control data is transferred to the terminal device in order to coordinate the vehicle at the depot, wherein said vehicle control data comprise a speed limit to be respected when driving at the depot;
  - wherein, as a result of the authorizing of the authenticity of the vehicle, an entrance to the depot is opened automatically; and, as a result of the exchange of loading/unloading information, a permission is given for manual or automatic opening of a loading-and-unloading bay gate of a loading-and-unloading bay assigned to the vehicle, for the purpose of loading or unloading freight, wherein the loading-and-unloading bay is in an area of the depot; and,
  - wherein the loading-and-unloading bay is assigned according to data transferred via the data connection, wherein, for this purpose, at least one of loading information and unloading information is transferred via the data connection.

14. The data-transfer system of claim 13, wherein said terminal device is a mobile terminal device or the terminal device is fixedly installed in the vehicle.

* * * * *

UNITED STATES PATENT AND TRADEMARK OFFICE
CERTIFICATE OF CORRECTION

PATENT NO. : 12,255,957 B2
APPLICATION NO. : 17/875097
DATED : March 18, 2025
INVENTOR(S) : Philip Meyer-Rössler et al.

Page 1 of 1

It is certified that error appears in the above-identified patent and that said Letters Patent is hereby corrected as shown below:

In the Specification

In Column 6:
Line 6: Delete "OF" and substitute -- DF --.
Line 44: Delete "vehicle 6" and substitute -- vehicle 5 --.
Line 54: Delete "site Is" and substitute -- site 1a --.

In Column 7:
Line 6: Delete "EMS." and substitute -- FMS. --.
Line 48: Delete "taken" and substitute -- token --.

In Column 8:
Line 4: Delete "1E" and substitute -- IE --.
Line 15: Delete "1B, 1E." and substitute -- IB, IE. --.
Line 53: Delete "1E," and substitute -- IE, --.
Line 53: Delete "1B," and substitute -- IB, --.

Signed and Sealed this
Twenty-fourth Day of June, 2025

Coke Morgan Stewart
*Acting Director of the United States Patent and Trademark Office*